United States Patent
Woerner

[11] Patent Number: 5,120,166
[45] Date of Patent: Jun. 9, 1992

[54] BROACHING TOOL WITH ADJUSTABLE CUTTING BLADES

[75] Inventor: Johann Woerner, Cadolzburg/Egersdorf, Fed. Rep. of Germany

[73] Assignee: Widia Heinlein GmbH, Lichtenau, Fed. Rep. of Germany

[21] Appl. No.: 551,438

[22] Filed: Jul. 10, 1990

[30] Foreign Application Priority Data

Jul. 12, 1989 [DE] Fed. Rep. of Germany ....... 3922963

[51] Int. Cl.$^5$ ............................................. B23P 15/42
[52] U.S. Cl. ...................................... 407/12; 407/39; 407/44; 407/79; 407/88
[58] Field of Search ................. 407/12, 13, 15, 38, 407/39, 36, 37, 40, 41, 44–46, 68, 75, 88, 92, 77–80

[56] References Cited

U.S. PATENT DOCUMENTS

| | | |
|---|---|---|
| 1,857,516 | 5/1932 | Oakley . |
| 3,755,868 | 9/1973 | LaForge et al. .................. 407/75 |
| 3,839,772 | 10/1974 | Shimomura et al. .................. 407/76 |
| 4,623,284 | 11/1986 | Greiff .................. 407/38 |
| 4,692,069 | 9/1987 | Kieninger .................. 407/39 |
| 4,848,977 | 7/1989 | Kieninger .................. 407/39 |

FOREIGN PATENT DOCUMENTS

| | | |
|---|---|---|
| 2339873 | 2/1974 | Fed. Rep. of Germany . |
| 8118680 | 10/1981 | Fed. Rep. of Germany . |
| 3125185 | 1/1983 | Fed. Rep. of Germany . |
| 3140905 | 6/1983 | Fed. Rep. of Germany . |
| 3807542 | 9/1989 | Fed. Rep. of Germany . |

Primary Examiner—Z. R. Bilinsky
Assistant Examiner—Kevin J. Carroll
Attorney, Agent, or Firm—W. G. Fasse

[57] ABSTRACT

A broaching tool has at least one adjustable cutting blade or plate. A two-fold adjustment is possible by mounting each cutting blade on an upper section of an insert mounted in a recess of a support or support ring sector. The upper insert section is secured to a lower insert section. The lower insert section is radially adjustable. The upper insert section is axially adjustable. Each adjustment can be made independently of the other adjustment.

8 Claims, 2 Drawing Sheets

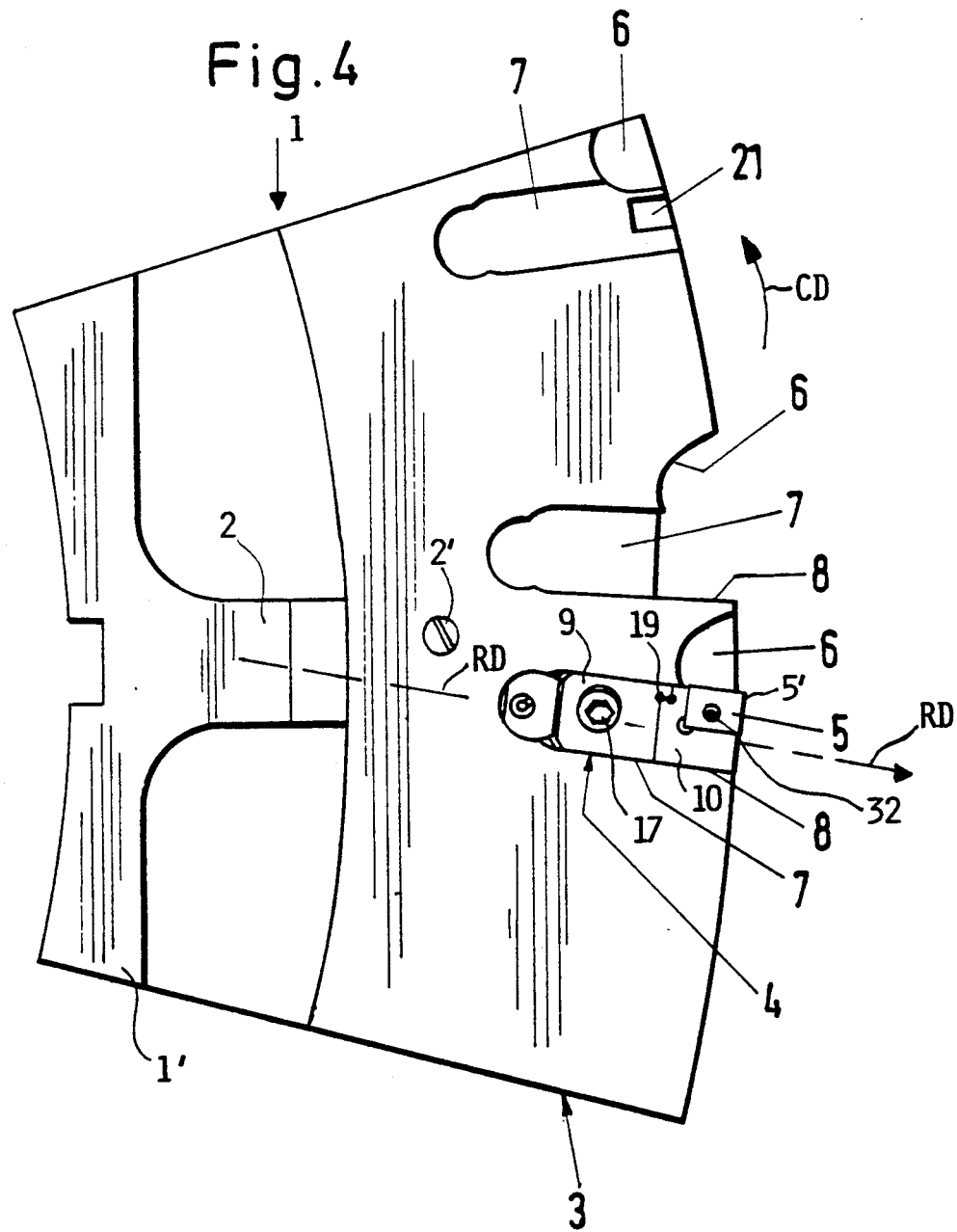

BROACHING TOOL WITH ADJUSTABLE CUTTING BLADES

FIELD OF THE INVENTION

The invention relates to a broaching tool with adjustable cutting blades or plates and so-called cassettes, referred to as inserts, carrying the cutting blades. The inserts are adjustably mounted to a support body forming part of the tool. The support body may carry a ring sector which in turn carries the inserts.

BACKGROUND INFORMATION

Various forms of such broaching tools are known in the prior art. Heretofore, it has been a serious problem how to secure and precisely mount the cutting blades to a support or support sector while maintaining the necessary adjustability in the axial and radial directions. This adjustment problem applies especially to the adjustability of the cutting blades in finishing tools, which require a particularly precise adjustment.

OBJECTS OF THE INVENTION

In view of the foregoing it is the aim of the invention to achieve the following objects singly or in combination:

- to securely mount the cutting blades to their supports in an adjustable manner;
- to achieve a high degree of precision adjustment individually for each blade by separate axial and radial adjustment means;
- to employ a divided cutting blade or plate carrying insert for two separate adjustments; and
- to provide means for securing the cutting blades or plates in an adjusted position.

SUMMARY OF THE INVENTION

According to the invention, these objects have been achieved in that each cutting blade or plate is individually arranged on a separate cassette or insert that can be axially and radially adjusted by respective adjustment means.

A high degree of adjusting accuracy is achieved only when each cutting blade or plate can be adjusted individually, one in the axial and the other in the radial direction. Such adjustment cannot be achieved directly with the support or support ring sector. Therefore, the cutting blade or plate is arranged in a cassette or insert, whereby the radially and axially adjustable cassette is mounted to the support or to the ring sector. Where ring sectors are used, they are mounted in turn to the support.

In order to achieve the separate axial and radial adjustabilities according to the invention, the cassette or insert comprises two sections, namely a lower or radially inner insert section and an upper or radially outer insert section, whereby the latter carries the cutting blade or plate. The adjustability of the cutting blades or plates is divided so that each section performs its respective adjustment. One cassette or insert section achieves the axial adjustability while the other cassette or insert section achieves the radial adjustability.

BRIEF DESCRIPTION OF THE DRAWINGS

In order that the invention may be clearly understood, it will now be described, by way of example, with reference to the accompanying drawings, wherein:

FIG. 4 is a side view of a ring segment with separate recesses for each axially and radially adjustable cassette or insert, one of which is shown in FIG. 4, whereby the view direction is in the axial direction, so that the axis of tool rotation extends perpendicularly to the plane of the drawing sheet.

Figure 1:
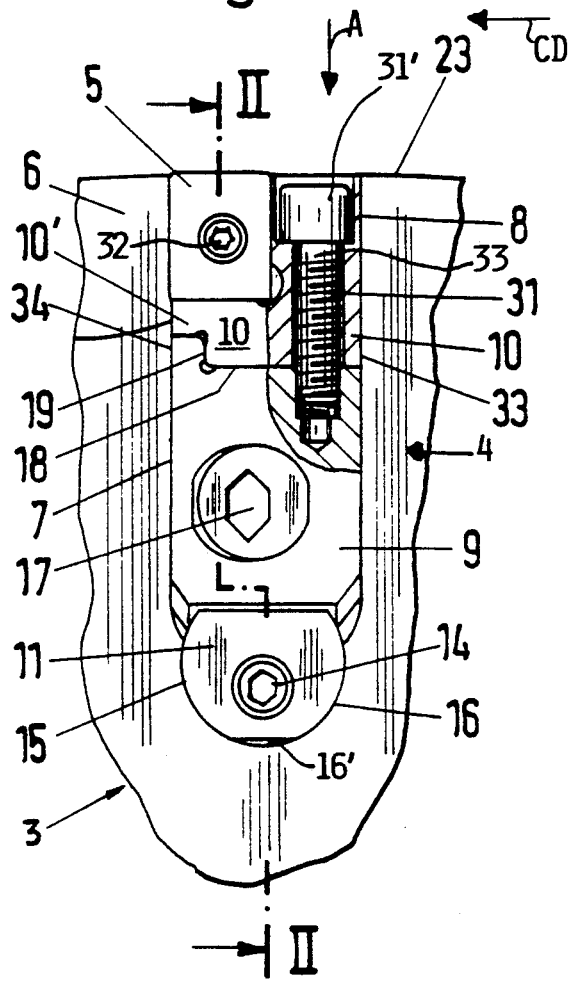
FIG. 1 is a broken-off side view, on an enlarged scale compared to FIG. 4, of a support or segment with one of the axially and radially adjustable cassettes or inserts carrying a cutting blade.

DETAILED DESCRIPTION OF PREFERRED EXAMPLE EMBODIMENTS AND OF THE BEST MODE OF THE INVENTION

Referring first to FIG. 4 to provide an overall orientation, a broaching tool 1, only a sector of which is shown in FIG. 4, has a support body 1' including a tool mounting ring 3. The radial direction RD and the circumferential or cutting direction CD are indicated by the respective arrows. The axial direction shown in FIG. 2 extends perpendicularly to the drawing sheet in FIG. 4. The ring 3 is secured by screws 2' to lands 2 of the support body 1'. However, the support body 1' itself may form a support for cutting plates 5 so that a separate mounting ring 3 may not be necessary.

According to the example embodiment of FIGS. 1 to 4, the broaching tool 1 comprises preferably at least one mounting ring 3 and at least one plate carrier or insert 4 carrying a single cutting plate 5 having a cutting edge 5'. A shavings or chip deflector member 6 is arranged in front of the cutting blade 5, as viewed in the cutting direction CD.

A recess 7 is provided in the mounting ring 3 for each insert 4. The longitudinal axis of the insert 4 and its recess 7 extends in a radial direction relative to the rotation or circumferential or cutting direction CD of the support 1 and of the mounting ring 3. The recess 7 has a backing wall 8 extending radially and forming a rear wall as viewed in the cutting or circumferential direction CD. The insert 4 bears directly against the entire length of the rear or backing wall 8 of the recess 7 in the support or mounting ring 3.

In order to achieve optimal conditions for the separate axial and radial adjustability of the cutting plate 5, the insert 4 of the invention comprises two sections, a lower insert section 9 and an upper insert section 10, the latter carrying the cutting blade 5. The cutting blade 5 is screwed into a recess by a screw 32.

The two insert sections 9 and 10 are adjustably mounted in the recess 7 in different directions. In the example embodiment, the upper insert section 10 is axially adjustable in the direction AD, while the lower insert section 9 is radially adjustable in the direction RD. Thus, both adjustments are fully independent of each other.

First adjustment means 11, 13, 14 are provided for the radial adjustment of the lower insert section 9. Radial adjustment is achieved with the help of an adjusting wedge 11 which bears against the downwardly facing end surface 12 of the lower insert section 9. According to FIG. 1, the cross-section of the adjusting key or wedge 11 has a circular shape with an upper cut-off segment forming a slope 13 bearing against the end surface 12. A lower cut-off segment 16' forms a free space, e.g. for lubricant. The slope 13 in cooperation with a differential screw 14 permits a radial adjustment of the lower insert section in the direction RD when a securing screw 17 passing through an elongated hole in the lower section 9 is loosened. The adjusting key 11 rests with its circular circumference 15 against the inner radially inwardly located extension 16 of the mounting recess 7 of the insert 4. The slope or slanted surface 13 of the wedge 11 slants toward a radially extending back wall 28 of said mounting means, said slanting surface of said first lower carrier section also slanting toward said back wall 28, so that a movement of said wedge 11 toward the back wall 28 provides one force component that pushes said first lower insert section 9 radially and another force component that pushes said first lower insert section 9 toward said back wall, thereby urging said first lower insert section 9 toward said back wall 28 while simultaneously moving it in a radial direction RD.

The clamping screw 17 fastens the lower insert section 9 to the support 1' or rather to the ring sector 3 of the support 1'. Prior to the radial adjustment, the screw 17 is loosened. Once the radial adjustment is completed, screw 17 is tightened again. Movement of the insert section 9 in the radial direction RD is possible, e.g. due to an elongated hole having a larger length than the diameter of the screw 17 passing through the section 9.

The lower insert section 9 and the upper insert section 10 bear flat against one another along a contact surface 18. It is advantageous that this contact surface 18 has a step 19 for limiting a leftward displacement of the upper section 10 relative to the lower section 9. It is further practical if the contact surface 18 between the upper and lower insert sections 9 and 10 lies in a plane parallel to the rotation axis AD and tangentially to the direction of rotation CD. The step 19 extends in the radial direction RD.

Second separate adjustment means 20 to 29 are provided for an axial adjustment independent of the above mentioned radial adjustment. An adjusting element 20 for adjusting an axial position of the upper insert section 10, bears axially against the support ring 3 and lies axially against the upper insert component 10. For axially adjusting the upper insert section 10, the adjusting element 20 is received in a slanted recess 21 provided in the support ring sector 3. The recess 21 has at least one support surface 22 slanting diagonally to the rotation axis AD. In the example embodiment, the recess 21 extends approximately radially inwardly from the periphery of the support ring sector 3.

Figure 2:
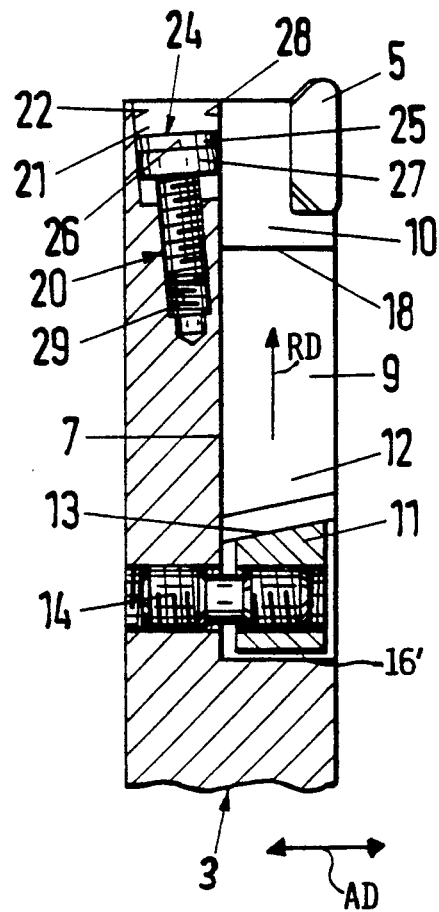
FIG. 2 is a sectional view along the section line II—II.
Figure 3:
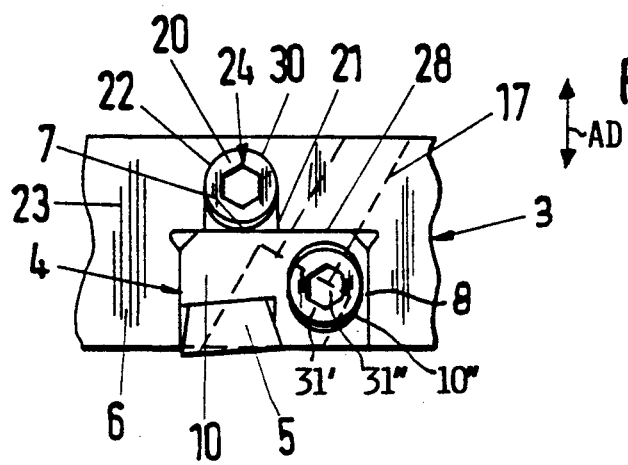
FIG. 3 is a top view in the direction of the arrow A in FIG. 1.

According to the example embodiment shown in the drawings, especially FIG. 2, a cylinder head screw 24 is used as the adjusting element 20. The free end 25 of the cylinder screw head 26 is cylindrical and lies against the slanting support surface 22 of the recess 21. The end 27 of the screw head 26 facing the screw shaft is frustum shaped or slanted and bears against the back wall 28 of the upper insert section 10. A tap-hole 29 for the cylinder head screw 24, lies in the same adjusting direction as the support surface 22. The support surface 22 is preferably the wall of a bore hole 30, see FIG. 3, that is open toward the recess 7 into which the upper insert section 10 is inserted, as seen in FIGS. 2 and 3. The upper insert section 10 is moved axially to the right in response to turning the screw 24 inwardly along the common contact surface 18 with the lower insert section 9. Turning screw 24 in the opposite direction frees the upper element 10 to be pushed axially to the left in FIG. 2.

A support surface 33 of the upper insert section 10, that absorbs the cutting force, bears against the boundary wall 8 of the recess 7. A second axially facing boundary wall 34 of the recess 7 slightly overlaps the upper insert section 10 below the cutting blade or plate 5, in the cutting direction CD as shown at 10' in FIG. 1, whereby the upper insert section 10 is held firmly in place.

Referring to FIGS. 2 and 3, a securing screw 31 with a head 31' having a hexagonal recess 31" for an Allen-wrench, secures the upper insert section 10 to the lower insert section 9 after the axial adjustment is completed. To permit the axial adjustment the screw 31 passes through an elongated hole 10" in the insert section 10. Prior to the axial adjustment the screw 31 is loosened.

Although the invention has been described with reference to specific example embodiments, it will be appreciated, that it is intended to cover all modifications and equivalents within the scope of the appended claims.

What I claim is:

1. A broaching tool having a rotational axis, comprising tool body means for supporting cutting means including cutting plate means for performing a milling operation, an insert for mounting said cutting plate means, a recess extending substantially radially relative to said rotational axis in said tool body means for receiving said insert, first separate means for a radial adjustment of said insert relative to said rotational axis, second separate means for an axial adjustment of said insert in a direction of said rotational axis, said insert having a first radially inner insert section arranged for cooperation with said first separate radial adjustment means, and a second radially outer insert section arranged for cooperation with said second separate axial adjustment means, said cutting plate means being secured to said second radially outer insert section, wherein said first radially inner insert section is only adjustable in a radial direction independently of any exclusively axial adjustment of said second radially outer insert section, and wherein a radially outward adjustment of said first radially inner insert section moves said second radially outer insert section radially outwardly.

2. The broaching tool of claim 1, wherein said first radially inner insert section is secured to said tool body means by a releasable screw, and wherein said second radially outer insert section is secured to said first radially inner insert section by a further releasable screw.

3. The broaching tool of claim 1, wherein said first radially inner insert section forms a mounting member for said second radially outer insert section, and wherein said second radially outer insert section is axially displaceable relative to said first radially inner insert section for an independent axial adjustment.

4. The broaching tool of claim 1, wherein said recess comprises a backing wall, said first radially inner insert section and said second radially outer insert section bearing both against said backing wall.

5. The broaching tool of claim 1, wherein said first separate means for a radial adjustment of said first radially inner insert section comprise an adjustment wedge having a slanted wedging surface facing radially outwardly and a circular surface facing radially inwardly, said wedging surface cooperating with a slanted surface of said first radially inner insert section, said circular surface bearing against a bottom of said recess.

6. The broaching tool of claim 1, wherein said second separate means for an axial adjustment of said second radially outer insert section comprise a cylinder head screw having a cylinder head with a free end and a conical end disposed toward a threaded shank of said cylinder head screw.

7. A broaching tool having a rotational axis, comprising tool body means for supporting cutting means including cutting plate means for performing a milling operation, an insert for mounting said cutting plate means, a recess extending substantially radially relative to said rotational axis in said tool body means for receiving said insert, first separate means for a radial adjustment of said insert relative to said rotational axis, second separate means for an axial adjustment of said insert in a direction of said rotational axis, said insert having a first radially inner insert section arranged for cooperation with said first separate radial adjustment means, and a second radially outer insert section arranged for cooperation with said second separate axial adjustment means, said cutting plate means being secured to said second radially outer insert section, wherein said first radially inner insert section is only adjustable in a radial direction independently of any exclusively axial adjustment of said second radially outer insert section, and wherein a radially outward adjustment of said first radially inner insert section moves said second radially outer insert section radially outwardly, and wherein said first radially inner insert section is secured to said tool body means by a releasable screw, and wherein said second radially outer insert section is secured to said first radially inner insert section by a further releasable screw.

8. A broaching tool having a rotational axis, comprising tool body means for supporting cutting means including cutting plate means for performing a milling operation, an insert for mounting said cutting plate means, a recess extending substantially radially relative to said rotational axis in said tool body means for receiving said insert, first separate means for a radial adjustment of said insert relative to said rotational axis, second separate means for an axial adjustment of said insert in a direction of said rotational axis, said insert having a first radially inner insert section arranged for cooperation with said first separate radial adjustment means, and a second radially outer insert section arranged for cooperation with said second separate axial adjustment means, said cutting plate means being secured to said second radially outer insert section, wherein said first radially inner insert section is only adjustable in a radial direction independently of any exclusively axial adjustment of said second radially outer insert section, and wherein a radially outward adjustment of said first radially inner insert section moves said second radially outer insert section radially outwardly, wherein said first separate means for a radial adjustment of said first radially inner insert section comprise an adjustment wedge having a slanted wedging surface facing radially outwardly and a circular surface facing radially inwardly, said wedging surface cooperating with a slanted surface of said first radially inner insert section, said circular surface bearing against a bottom of said recess.

* * * * *